Figure 8:
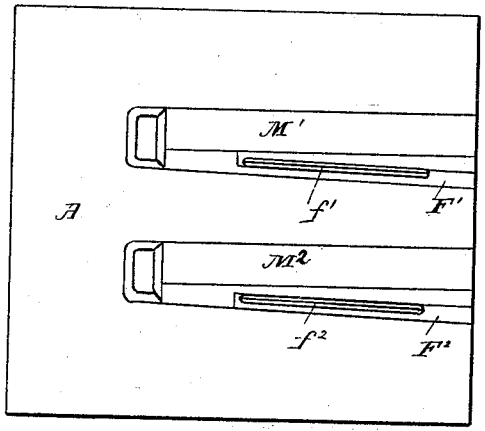

(No Model.)  3 Sheets—Sheet 1.
D. WILCOX.
DIE FOR MOLDING HORSESHOE BLANKS.
No. 265,908.  Patented Oct. 10, 1882.
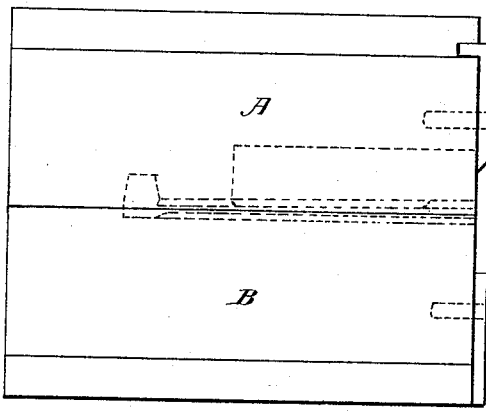
Fig 1.
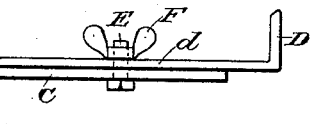
Fig 2.
Fig 4.
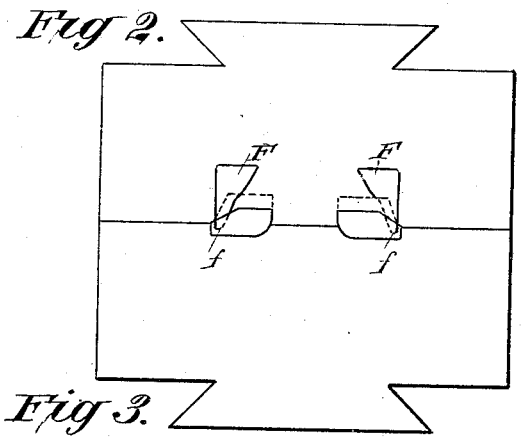
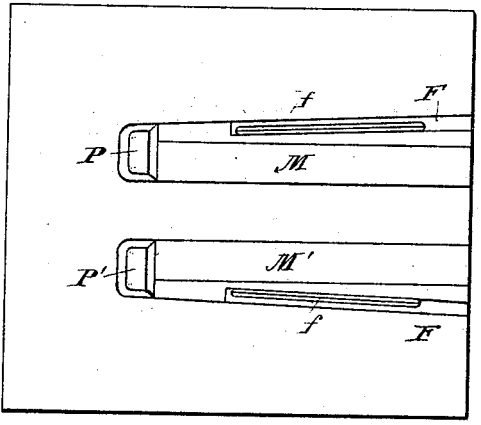
Fig 3.
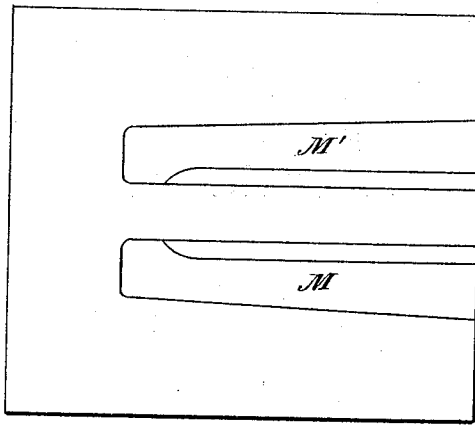
Fig 5.
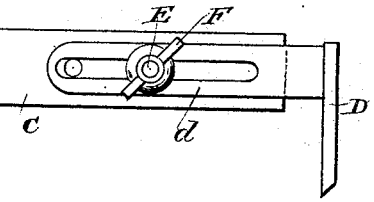
Attest:
Geo. T. Smallwood Jr.
L. W. Hopkins
Inventor:
Darius Wilcox
By Knight Bros.
Attys.

(No Model.) 3 Sheets—Sheet 2.
D. WILCOX.
DIE FOR MOLDING HORSESHOE BLANKS.
No. 265,908. Patented Oct. 10, 1882.
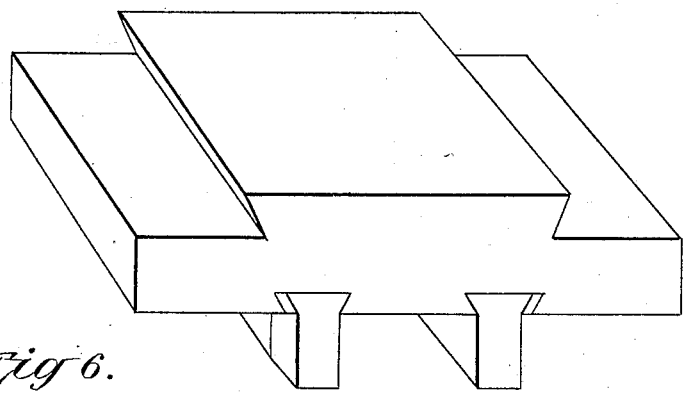
Fig 6.
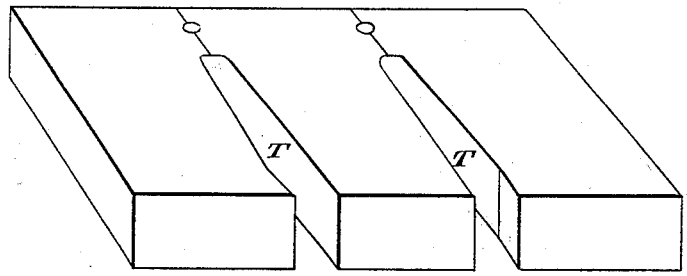
Fig 7.
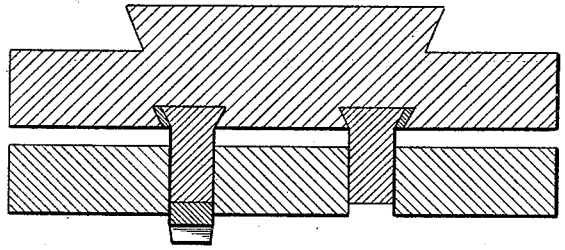

(No Model.)  3 Sheets—Sheet 3.

D. WILCOX.
DIE FOR MOLDING HORSESHOE BLANKS.

No. 265,908. Patented Oct. 10, 1882.

Attest:
Geo. T. Smallwood Jr.
D. M. Hopkins

Inventor:
Darius Wilcox
By Knight Bros
attys

UNITED STATES PATENT OFFICE.

DARIUS WILCOX, OF DERBY, ASSIGNOR OF ONE-HALF TO ISAAC P. HOWE, OF BIRMINGHAM, CONNECTICUT.

DIE FOR MOLDING HORSESHOE-BLANKS.

SPECIFICATION forming part of Letters Patent No. 265,908, dated October 10, 1882.

Application filed February 24, 1882. (No model.)

*To all whom it may concern:*

Be it known that I, DARIUS WILCOX, a citizen of the United States, residing at Derby, in the county of New Haven and State of Connecticut, have invented new and Improved Dies for Making Horseshoe-Blanks, of which the following is a specification.

The object of my invention is to make a horseshoe-blank in such complete and symmetrical form that when bent into shape it will produce a finished horseshoe without the necessity of final swaging and forming in finishing-dies, as in the common practice with machine-made horseshoes.

In my Patent No. 223,128, dated October 12, 1880, I make claim to the process of forming fifth-wheel blanks by swaging one end and the central portion in dies constructed substantially alike, and then changing the partly-formed blank end for end and swaging its second end in the same or corresponding dies, so as to gage the length of the second end from the center first formed and produce ends of precisely corresponding shape. This broad idea of shaping or swaging a bar of metal is also embodied in the present invention, which consists in forming a horseshoe-blank by stamping its ends successively between dies formed with two pairs of matrices which are counterparts of each other, (with the necessary reversion in position,) so that a horseshoe-blank is formed one half or more in one matrix, and is then turned end for end for the striking or stamping of its other part to accurately corresponding shape in the second matrix. In connection with a bed-die of the character specified I use an adjustable gage, by which the required length of the blank can be accurately measured in the act of final stamping. I prefer to swage each end of the blank in successive die-cavities having creasing-tongues of different height, so that the said creases may be partially formed in the first cavity and completed in the second. The creasers are made removable, and may be in the bed-die, but are preferably applied to the top die, because it is thus exposed to heat for a shorter time.

In order that the invention may be fully understood, I will proceed to describe it with reference to the accompanying drawings, in which—

Figure 9:
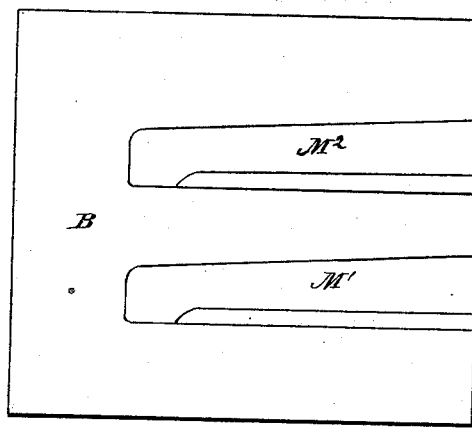
Figure 10:
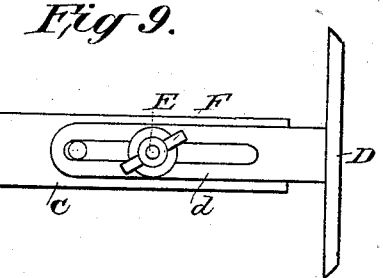
Figure 10:
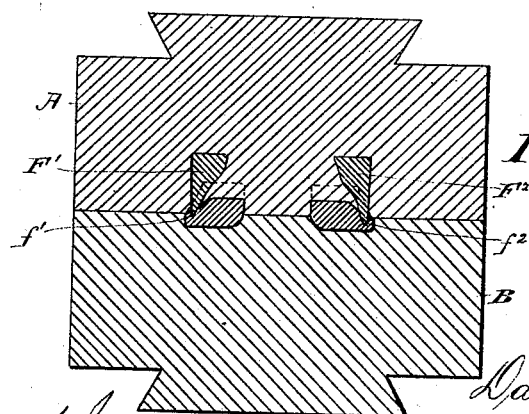

Figure 1 is a side elevation of a pair of dies such as are employed in carrying out my invention. Fig. 2 is an end view of the same. Fig. 3 is a plan of the bed-die. Fig. 4 is a face view of the upper die. Fig. 5 is a perspective view of the blank. Fig. 6 is a perspective view of trimming-dies employed to remove the fins. Fig. 7 is a transverse section of the same. Figs. 8 and 9 are face views of a pair of dies (for one end of the blank) of the preferred form of dies used in carrying out my invention. Fig. 10 is a transverse section of the same.

A represents the upper die; B, the bed-die, and C a gage-bar fixed to the bed-die by a screw, $b$, or otherwise, and having adjustably attached to it a gage, B, made of T or L shape, to adapt it to extend across or partially across the open ends of one or both of the matrices M M'. The shank $d$ of the gage is slotted, as represented, to receive a guide pin or screw, E, and a clamp-screw, F, permitting its movement in a right line and its fixture in any position to which it may be set in the required proximity to the face of the die.

The matrices M M' in the dies A B are made of the required shape to form the respective ends of the horseshoe-blank, each pair of matrices being somewhat more than half the length of the blank, so as to extend beyond the middle. In the present illustration the matrices in the bed-die form the upper half of the blank, while the lower half is formed in the matrices of the upper die, which are made with pockets P P' for the reception and shaping of the heel-calks T T'.

In operation the blank is first formed by rolling to approximately the required shape, with protuberances for the calks T T'. One end of the blank is then placed in the matrices M M' of the upper and lower dies, with the calk-projection T in the pocket P, and rather more than one-half of the blank is thus stamped and finished. The gage D is then accurately set at the required distance from the inner extremity of the matrices in the bed-dies to agree with the required length of blank. The finished end of the blank is then placed against the gage D and the unfinished end in the matrix M'. The top die, A, is again placed in position and struck with a drop-hammer, which finishes the blank with ends precisely alike, and by the described use of the gage D insures the swaging of it to precisely the required length. The nail-creases are produced in the same operation by projecting tongues $f$ on plates or blocks F, which are made removable, so as to permit their ready repair or renewal when worn.

I prefer to form the dies for the stamping of the respective ends of the blank each with two pairs of cavities, so that the first end of the blank may be formed at two operations, and so with the second. This preferred mode of carrying out my invention is illustrated in Figs. 9 and 10 by views of the dies employed for one end of the blank, those for the other end being precisely similar, excepting that the cavities are reversed in shape and the dies employed for the first end do not require the gage. By thus using two matrices in the dies for each end I am enabled to bring the blank to the required form and produce the nail-creases with less violence and strain. The punch or die which is to form the under surface of the shoe (being preferably the top die or punch) has in its cavities creaser-blocks F' F², with tongues $f'$ $f^2$ of different depth, so that in first stamping the end of the blank in the matrix M' the smaller tongue $f'$ will produce a rudimentary crease, which crease will be completed by the second and more prominent tongue, $f^2$, in stamping the same end of the blank in the second matrix, M². One end of the blank having been thus completed, (except needful trimming,) its other end is formed in like manner by twice stamping in the second pair of dies by the aid of the T-shaped gage D, as already described with reference to the L-shaped gage of the single-cavity dies, and the blank is thus passed through the trimming-dies T T', Figs. 6 and 7, for removing the fins.

The gage may be attached in any suitable position, either to the die or the die-holder, as most convenient.

The nail-holes may be punched in the same operation, if desired, or by a subsequent operation, in customary manner.

Having thus described my invention, the following is what I claim as new therein and desire to secure by Letters Patent:

The combination of the lower die, having the matrices M M' and adjustable gage D, and the upper die, A, provided with the matrices M M', having the pockets P P' and creaser-tongues $f$, as and for the purpose set forth.

DARIUS WILCOX.

Witnesses:
OCTAVIUS KNIGHT,
WALTER ALLEN.